(12) United States Patent
Sorescu

(10) Patent No.: US 8,565,392 B2
(45) Date of Patent: Oct. 22, 2013

(54) APPARATUS AND METHOD FOR PHYSICAL INTERACTION OVER A DISTANCE USING A TELECOMMUNICATION DEVICE

(75) Inventor: Bogdan Ionut Sorescu, Craiova (RO)

(73) Assignee: WOOW Inc. Limited, Wanchai (HK)

( * ) Notice: Subject to any disclaimer, the term of this patent is extended or adjusted under 35 U.S.C. 154(b) by 161 days.

(21) Appl. No.: 13/292,523

(22) Filed: Nov. 9, 2011

(65) Prior Publication Data

US 2012/0121074 A1   May 17, 2012

Related U.S. Application Data

(60) Provisional application No. 61/411,792, filed on Nov. 9, 2010.

(51) Int. Cl.
   *H04M 11/00* (2006.01)
(52) U.S. Cl.
   USPC ............... 379/90.01; 379/93.19; 379/102.02
(58) Field of Classification Search
   USPC .............................. 379/90.01, 93.19, 102.02
   See application file for complete search history.

(56) References Cited

U.S. PATENT DOCUMENTS

| | | | |
|---|---|---|---|
| 5,930,728 A | 7/1999 | Evanyk | |
| 7,031,745 B2 | 4/2006 | Shen | |
| 7,280,041 B2 * | 10/2007 | Ryou | 340/539.12 |
| 7,305,435 B2 | 12/2007 | Hamynen | |
| 8,294,557 B1 * | 10/2012 | El Saddik et al. | 340/407.1 |
| 2002/0191011 A1 | 12/2002 | Rasouli | |
| 2003/0139654 A1 | 7/2003 | Kim et al. | |
| 2004/0207720 A1 | 10/2004 | Miyahara et al. | |
| 2005/0001727 A1 | 1/2005 | Terauchi et al. | |
| 2005/0136987 A1 | 6/2005 | Forlenza et al. | |
| 2005/0181827 A1 | 8/2005 | Nieminen-Sundell et al. | |
| 2007/0005524 A1 | 1/2007 | Iwachin | |
| 2007/0072601 A1 | 3/2007 | Kim et al. | |
| 2007/0263573 A1 | 11/2007 | Wong et al. | |
| 2007/0266173 A1 | 11/2007 | Wong et al. | |
| 2008/0274769 A1 * | 11/2008 | Linden | 455/556.1 |
| 2010/0255830 A1 | 10/2010 | Manolescu et al. | |

FOREIGN PATENT DOCUMENTS

WO   2010114284   3/2010

* cited by examiner

*Primary Examiner* — Stella Woo
(74) *Attorney, Agent, or Firm* — Kelley Drye & Warren, LLP

(57) ABSTRACT

Methods and apparatus that permit two users to physically interact with one another from a distance using their telecommunication device are disclosed. In an exemplary method, a connection between the telecommunication devices may be established and an indication of inputs at the first and second telecommunication devices received. The inputs may be verified to have been input at the telecommunication devices either substantially simultaneously or overlapping in time. A signal may be sent to the telecommunication devices instructing them to provide a physically perceptible output responsive to verification of substantially simultaneous or overlapping inputs.

26 Claims, 3 Drawing Sheets

APPARATUS AND METHOD FOR PHYSICAL INTERACTION OVER A DISTANCE USING A TELECOMMUNICATION DEVICE

CROSS REFERENCE TO RELATED APPLICATIONS

This application relates to, and claims the benefit of the earlier filing date and priority of U.S. Provisional Patent Application No. 61/411,792, filed on Nov. 9, 2010, and entitled "Apparatus And Method For Physical Interaction Over A Distance Using A Telecommunication Device."

FIELD OF THE INVENTION

The present invention relates generally to a system and method for enabling the telecommunication devices of two or more users to interact physically with one another over a distance.

BACKGROUND OF THE INVENTION

Telecommunication devices, mobile, landline or other, are increasingly used to provide communication between one or more persons. Communication using these telecommunication devices may be in the form of voice communication, text messages, instant messaging, sound (e.g., audible alerts), video, picture, or multi-media information. Voice communication may be with one person or with more than one person in the form of a three-way call or a conference call. Text, audible, picture, video, and multi-media information may also be sent to one person or more than one person using the multiple address function that is common in telecommunication devices.

For voice communication, the caller may dial a number from his telecommunication device and the call may be routed through the telecommunication network to the recipient's telecommunication device. Alternatively, the call may be routed through the Internet, or a combination of the Internet and the telecommunication network. The recipient's telecommunication device may inform the recipient through events such as an audible alert, vibration, visual indicator or some other means, or combination of visual, tactile and audible signals, of the incoming call. Once aware of the incoming call, the recipient may choose to receive the call and communicate with the caller, or may choose to ignore the call. Likewise, the caller may send a message in the form of a text message, picture, audio file or indicator, video recording, or other multimedia content to one or more recipients. These messages may be routed through the telecommunication network and/or the Internet to the recipient's telecommunication device. The recipient's telecommunication device may alert the recipient of the incoming message, and the recipient may view and respond to the incoming message or may choose to view them later at a convenient time.

All of these modes of communication require the caller to send a voice, audible, text, video, picture, or multimedia message, which are then delivered to the recipient. The recipient may respond to the incoming message when he is notified of their arrival or may do so later. In these cases, the communication between the caller and the recipient is not instantaneous; there is at least a lag equivalent to the time taken to deliver the voice or message from one telecommunication device to the other over the telecommunication network or the Internet. Moreover, none of these modes of communication provides the sensation of physical interaction referred to herein as "touch," whether such physical interaction be perceived through tactile, aural, or visual sensation, when communicating with one or more persons. Neither do any of the present modes of communication using a telecommunication device permit the caller and the recipient to simultaneously share the same or different physical sensory stimulus so that they perceive that they are physically interacting with one another over a period of time.

SUMMARY OF THE INVENTION

Responsive to the foregoing challenges, Applicants have developed a method for simulating physical interaction between a caller and a recipient using telecommunication devices, the method comprising: providing a server to communicate with the telecommunication devices; registering the telecommunication devices with the server; establishing a communication link between the telecommunication devices in response to conformation of registration of the devices at the server; receiving an indication of substantially simultaneous input occurring at the caller's and the recipient's telecommunication devices; and providing a physically perceptible output at the caller's and/or recipient's telecommunication devices in response to verification of the substantially simultaneous input at both the caller's and recipient's devices.

Applicants have also developed a method for simulating physical interaction between a caller and a recipient using telecommunication devices, the method comprising: providing a server to communicate with the telecommunication devices; subscribing the telecommunication devices with the server; placing a call using an application installed on the telecommunication devices; authenticating the caller's telecommunication device with the server; authenticating a recipient's telecommunication device with the server; synchronizing the caller's and recipient's telecommunication devices; receiving indication of inputs at the caller's and recipient's telecommunication devices; verifying whether the inputs at the caller's and recipient's telecommunication devices are substantially simultaneous; and providing a physically perceptible output at the caller's and recipient's telecommunication devices responsive to verification of substantially simultaneous inputs.

Applicants have further developed a method for simulating physical interaction between a caller and a recipient using the caller's and recipient's telecommunication devices, the method comprising: providing a server to communicate with the telecommunication devices; subscribing the telecommunication devices with the server; establishing a connection between the telecommunication devices; authenticating the caller's telecommunication device with the server; authenticating the recipient's telecommunication device with the server; receiving indication of inputs at the caller's and recipient's telecommunication devices; verifying that the inputs at the caller's and recipient's telecommunication devices overlapped in time; and providing a physically perceptible output at the caller's and recipient's telecommunication devices responsive to verification of overlapping inputs.

Still further, Applicants have developed an innovative method for simulating physical interaction between users of first and second telecommunication devices, the method comprising: establishing a connection between the telecommunication devices; receiving indication of inputs at the first and second telecommunication devices; verifying that the inputs at the telecommunication devices overlapped in time; and sending one or more signals to the telecommunication devices to provide a physically perceptible output at the telecommunication devices responsive to verification of overlapping inputs.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

As embodied herein, the WooW Love Connection ("WLC") allows the telecommunication devices of two users to provide physical interaction with one another from a distance using their telecommunication devices. Embodiments of the present invention may include both apparatus and methods for allowing the telecommunication devices of two or more users to provide physical interaction with one another from a distance.

The various methods discussed herein may be implemented between telecommunication devices that are connected through a telecommunication network or over the Internet. One skilled in the art will recognize that the present invention can be implemented using any type of communication device, including but not limited to conventional telephones, wireless telephones, cell telephones, pagers, personal digital assistants (PDAs), personal communication devices, PDAs, smart phones, or any communication device capable of transmitting and receiving information, including, for example, handheld email devices, handheld computers, desktop computers, laptop computers, and the like. Accordingly, any particular structure and design of the telecommunication devices is merely one example of a physical device for implementing the techniques of the present invention, and is referred to for illustrative purposes and not to imply any limitations on the scope of the present invention. To the extent that embodiments of the present invention require electronic components and circuits, which are generally known to those skilled in the art, circuit details are not specified in order to not distract from the teachings of the present invention.

The telecommunication device may include a screen, which may be a liquid crystal display (LCD), or other type of display for presenting output to the user, including representations of dialing buttons, menus, and the like. The telecommunication device may also include one or more mechanisms for accepting input from the user. In one embodiment, the screen is touch-sensitive, so that the user may interact with the telecommunication device by touching or writing on the surface of screen using a stylus, finger, or other object. Touch screens may receive inputs other than those used to select numeric or text symbols. For example, a touch screen may be rubbed or received a patterned tactile input. In another embodiment, in addition to, or as a surrogate for, the touch-sensitive screen, the telecommunication device may also include a QWERTY keyboard, or any other type of keyboard or button based interface, for enabling rapid entry of an input, including text, and may further include buttons for performing various other functions associated with the operation of the telecommunication device and its applications.

Figure 1:
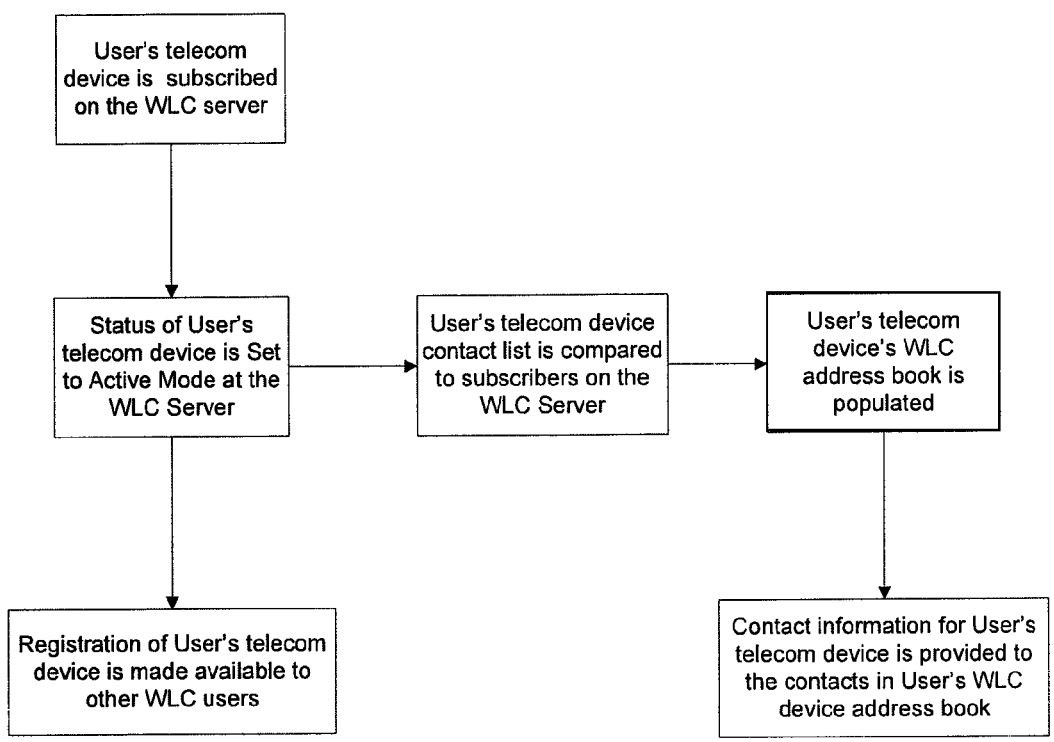
FIG. 1 is an exemplary block diagram of a process for registering with the WLC Server.
Figure 2:
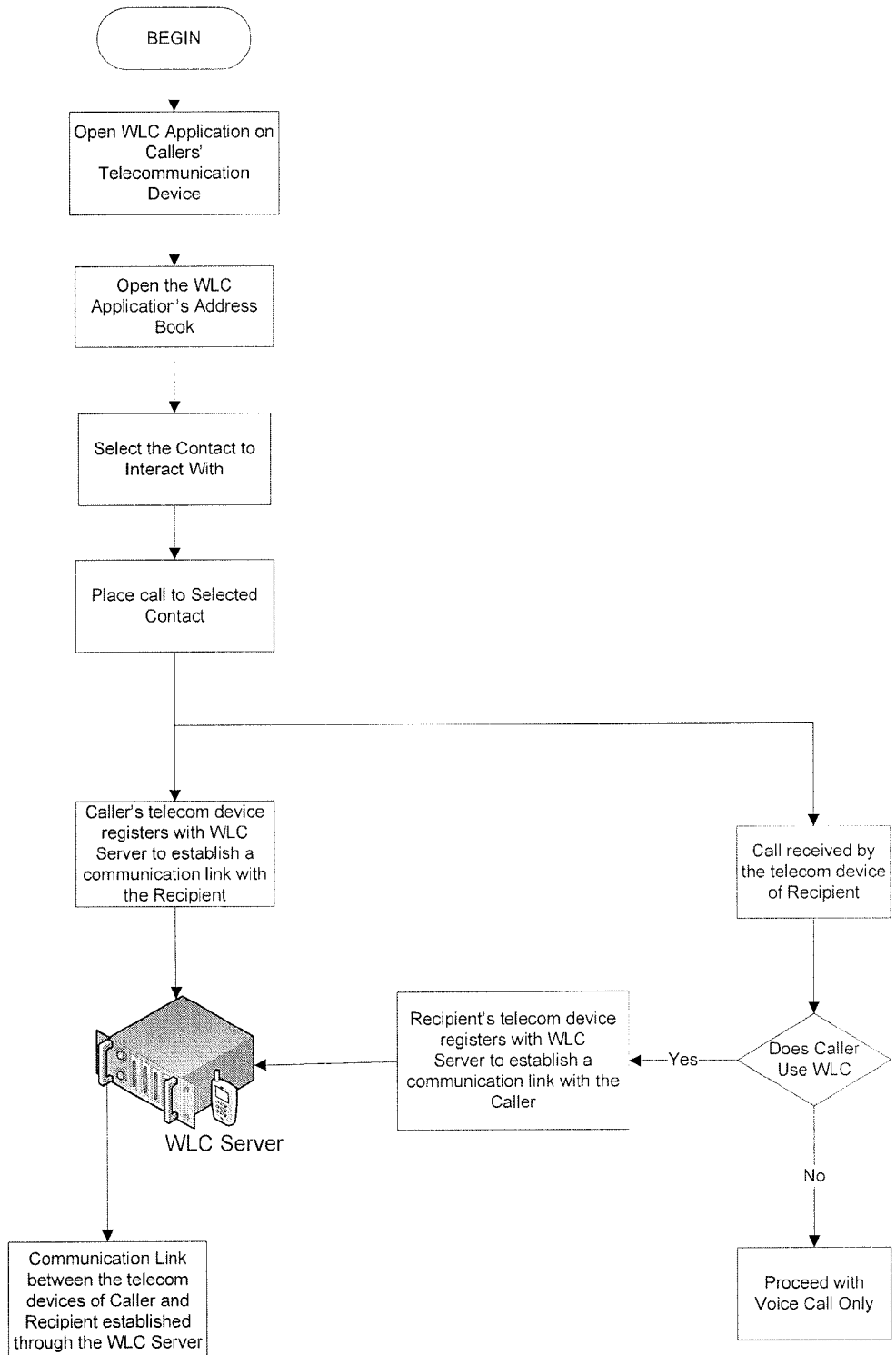
FIG. 2 is an exemplary block diagram of a process for simulating physical interaction between a caller's telecommunication device and a recipient's telecommunication device.
Figure 3:
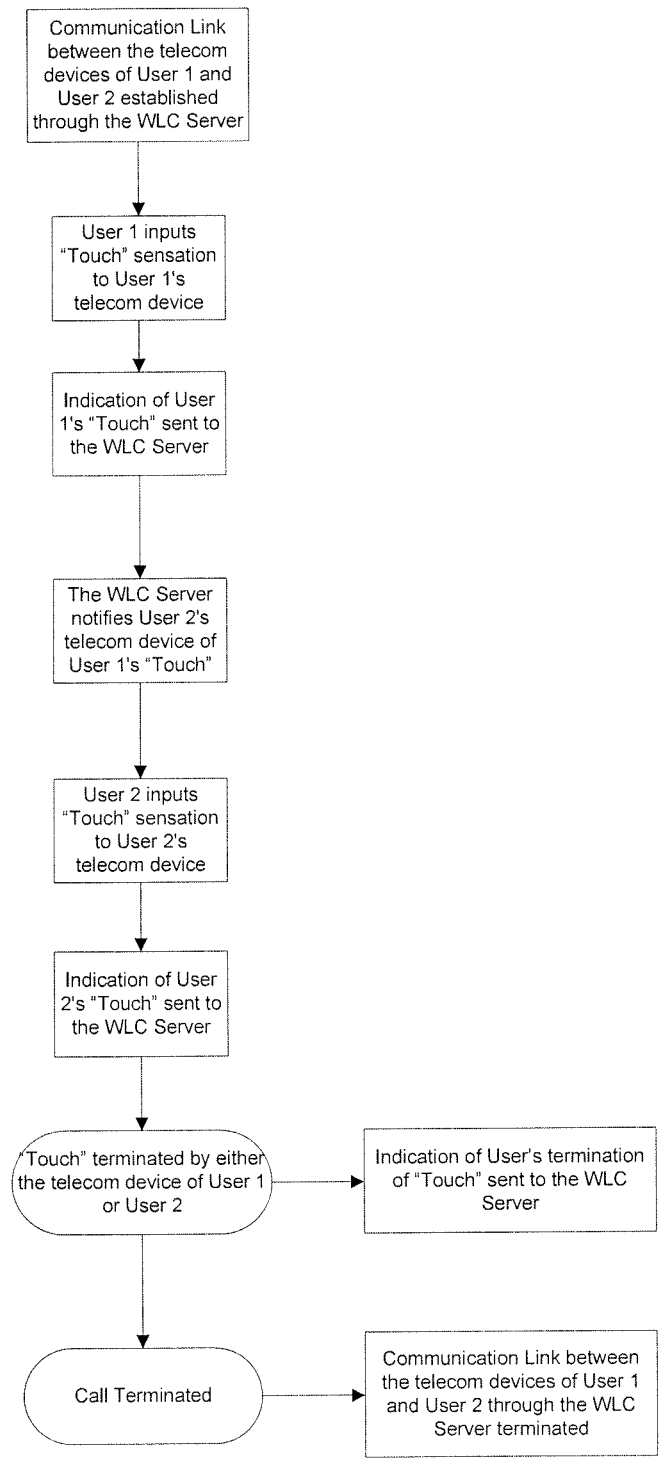
FIG. 3 is an exemplary block diagram of the process for initiating and terminating a "touch" sensation between the telecommunication devices of two device users.

Reference will now be made in detail to a first embodiment of the present invention, an example of which is illustrated in the accompanying drawings. A first embodiment of the present invention is shown in FIGS. 1-3. With reference to FIG. 1, the process of subscribing a phone number to the WLC application is shown. As shown in FIG. 1, the user may log on to the WLC server, subscribe its telecommunication device to the WLC server. After the subscription process is completed, the status of the telecommunication device of the user on the WLC server may be set to active. After the status of the user's telecommunication device is set to active, the subscription of the user's telecommunication device may be advertised to other WLC users. The phone contact list of the telecommunication device of the user may then be compared to the list of subscribers on the WLC server. The address book for the WLC application that may be installed on the users telecommunication device may then be populated with the contacts that the user has in his telecommunication device, who are also registered on the WLC server. The contact for the user's telecommunication device may then be shared with the contacts in the address book of the user's WLC application.

FIG. 2 displays the process for calling and simulating physical interaction with a person using the WLC application. To establish communication with the telecommunication device of a person using the WLC application, the WLC application on the caller's telecommunication device may be opened. The address book of the WLC application may then be accessed, and a contact may be selected. A communication link with the selected contact may be initiated, for example, by tapping the contact on the touch screen of the telecommunication device. Tapping the contact on the touch screen may trigger a call to the selected recipient through the telecommunication network or the Internet, while also initiating a connection with the WLC server. After the connection with the WLC server is established, the WLC server may authenticate the connection with the caller's telecommunication device, register the calling telecommunication device, and attempt to create a communication link between the caller's telecommunication device and the recipient's telecommunication device.

As shown in FIG. 2, when the call is received by the telecommunication device of the intended recipient, the WLC application that is running on the recipient's telecommunication device verifies whether the caller is using WLC. If the recipient's WLC application identifies the telecommunication device of the caller as a WLC user, then the WLC application may register the telecommunication device of the caller with the WLC server and attempt to create a communication link with the caller's telecommunication device through the WLC Server. The WLC server may require authentication of the recipient's telecommunication device before permitting registration with the server and allowing the creation of the communication link. While the communication link is being established between the telecommunication device of the caller and the recipient, the WLC application for both the caller and the recipient may display, for example, any one of the three screen states: an introductive splash screen, an intermediate screen that shows the connection is being processed, and/or a final screen where the caller and recipient can experience the "Touch" feeling. This screen may have two buttons, an exit button and a speaker button.

When the caller places the call from the WLC Application, his telecommunication device may simultaneously attempt to log in to the WLC Server. Likewise, when the recipient's telecommunication device identifies the caller as a WLC subscriber, it may attempt to log on to the WLC Server while simultaneously receiving the call. After the telecommunication device of the caller and the recipient have been authenticated and logged in to the WLC server, they may be registered in the server's database as having an operational status. While attempting to log on to the WLC server, the recipient's WLC application may send the caller's phone number to the WLC server to enable the server to connect the telecommunication device of the caller with the telecommunication device of the recipient. The WLC server may identify the caller and the recipient, match the two, and may establish a communication link between their respective devices. Any action taken after the synchronization will be sent from the telecommunication device of one to the telecommunication device of the other.

As shown in FIG. 3, once the caller and the recipient are in a phone call or otherwise connected by a communication link, either the caller or the recipient may initiate the "touch" sensation through their respective telecommunication devices. When the caller touches the screen of his telecommunication device, for example a smart phone's touch sensitive screen, the recipient's screen may change its state notifying the recipient that the caller is touching the screen on the other end. Thereafter, if the recipient touches the screen of her telecommunication device substantially simultaneously or overlapping in time with the touch input by the caller, both telecommunication devices of the caller and the recipient may provide an output, such as vibrating until the substantially simultaneous or overlapping input ceases. Similarly, the recipient can initiate the "touch" sensation, which may be accepted and maintained by the caller in like fashion. The "touch" feeling may be experienced when both the caller and the recipient touch the screen at the substantially simultaneous time or overlapping in time. The determination of whether the touch (i.e., input) by both the caller and the recipient is substantially simultaneous or overlapping may be made at the telecommunication devices of the caller or the recipient, or at the WLC Server, or at any other intermediate server.

The user may change the action that is initiated when the caller and the recipient simultaneously touch the screen of their telecommunication devices. Besides vibration, the user may select different types of sound to share, or they may choose to share different types of files, such as audio, pictures, video clips etc. and the like, and combinations thereof. The users may also have the option of uploading a picture and using it as background for the last screen while the application is running during the call. Further, the users may also have the option of uploading a picture to the background of the person they are about to call. The WLC application screen that is displayed on the user's telecommunication device may also be split into matrices, and depending on the portion of the screen that is activated by either the caller or the recipient, different action may be initiated.

As discussed above, the present invention is not limited to a device resembling the particular telecommunication device described above in connection with the WLC application. In particular, the invention may be implemented in other types of devices and using other types of input and output mechanisms. In addition, the above-described techniques can be used in connection with any type of information or communication mode associated with a contact, including, for example, SMS addresses or handles, email addresses, presence information, and the like. Moreover, the above-described techniques can be used in connection with a group call when the caller calls one or more than one recipient.

The present invention also relates to an apparatus for performing the operations herein. The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. The required structure for a variety of these systems appears from the description. In addition, the present invention is not described with reference to any particular programming language. It will be appreciated that a variety of programming languages may be used to implement the teachings of the invention as described herein.

As will be understood by those skilled in the art, the invention may be embodied in other specific forms without departing from the spirit or essential characteristics thereof. For example, the particular architecture depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. In addition, the present invention may be implemented as a method, process, user interface, computer program product, system, apparatus, or any combination thereof. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. A method for simulating physical interaction between a caller and a recipient using telecommunication devices, the method comprising:
   providing a server to communicate with the telecommunication devices;
   registering the telecommunication devices with the server;
   establishing a communication link between the telecommunication devices in response to conformation of registration of the devices at the server;
   receiving an indication of substantially simultaneous inputs occurring at the caller's and the recipient's telecommunication devices; and
   providing a physically perceptible output at the caller's and/or recipient's telecommunication devices in response to verification of the substantially simultaneous inputs at the caller's and recipient's devices.

2. The method of claim 1 wherein at least one input is a tactile input.

3. The method of claim 1 wherein at least one input is an audible input.

4. The method of claim 1 wherein the output is a tactile output.

5. The method of claim 4 wherein the tactile output is a vibration output.

6. The method of claim 1 wherein the output is an audible output.

7. The method of claim 1 wherein the output is a visual output.

8. The method of claim 1 wherein the output is the combination of two or more outputs selected from the group consisting of: tactile, audible and visual outputs.

9. The method of claim 1 wherein the inputs are tactile motions applied to a touch screen which are not used to select numeric or text symbols on the touch screen.

10. The method of claim 1 further comprising:
receiving an indication of a tactile input from the caller's telecommunication device; and
sending a notification of the input of the tactile input to the recipient's telecommunication device in response to the receipt of the indication of the tactile input at the caller's telecommunication device.

11. A method for providing physical interaction between a caller and a recipient using telecommunication devices, the method comprising:
providing a server to communicate with the telecommunication devices;
subscribing the telecommunication devices with the server;
placing a call using an application installed on the telecommunication devices;
authenticating the caller's telecommunication device with the server;
authenticating a recipient's telecommunication device with the server;
synchronizing the caller's and recipient's telecommunication devices;
receiving indication of inputs at the caller's and recipient's telecommunication devices;
verifying whether the inputs at the caller's and recipient's telecommunication devices are substantially simultaneous; and
providing a physically perceptible output at the caller's and recipient's telecommunication devices responsive to verification of substantially simultaneous inputs.

12. The method of claim 11 wherein at least one input is selected from the group consisting of: a tactile input and an audible input.

13. The method of claim 12 wherein the output is a tactile output.

14. The method of claim 13 wherein the tactile output is a vibration output.

15. The method of claim 11 wherein the inputs are tactile inputs applied to a touch screen which inputs are not used to select numeric or text symbols on the touch screen.

16. The method of claim 11 further comprising:
receiving an indication of a tactile input from the caller's telecommunication device; and
sending a notification of the input of the tactile input to the recipient's telecommunication device in response to the receipt of the indication of the tactile input at the caller's telecommunication device.

17. A method for simulating physical interaction between a caller and a recipient using the caller's and recipient's telecommunication devices, the method comprising:
providing a server to communicate with the telecommunication devices;
subscribing the telecommunication devices with the server;
establishing a connection between the telecommunication devices;
authenticating the caller's telecommunication device with the server;
authenticating the recipient's telecommunication device with the server;
receiving indication of inputs at the caller's and recipient's telecommunication devices;
verifying that the inputs at the caller's and recipient's telecommunication devices overlapped in time; and
providing a physically perceptible output at the caller's and recipient's telecommunication devices responsive to verification of overlapping inputs.

18. The method of claim 17 wherein at least one input is selected from the group consisting of: a tactile input and an audible input.

19. The method of claim 18 wherein the output is a tactile output.

20. The method of claim 19 wherein the tactile output is a vibration output.

21. The method of claim 17 wherein the inputs are tactile inputs applied to a touch screen which inputs are not used to select numeric or text symbols on the touch screen.

22. A method for simulating physical interaction between users of first and second telecommunication devices, the method comprising:
establishing a connection between the telecommunication devices;
receiving an indication of an input from the first telecommunication device;
sending a notification of the input to the second telecommunication device in response to the receipt of the indication of the input at the first telecommunication device;
receiving indication an input at the second telecommunication device;
verifying that the inputs at the first and second telecommunication devices overlapped in time; and
sending one or more signals to the telecommunication devices to provide a physically perceptible output at the telecommunication devices responsive to verification of overlapping inputs.

23. The method of claim 22 wherein at least one input is selected from the group consisting of: a tactile input and an audible input.

24. The method of claim 23 wherein the output is a tactile output.

25. The method of claim 24 wherein the tactile output is a vibration output.

26. The method of claim 22 wherein the inputs are tactile inputs applied to a touch screen which inputs are not used to select numeric or text symbols on the touch screen.

* * * * *